United States Patent [19]
Calcagno

[11] Patent Number: 4,490,795
[45] Date of Patent: Dec. 25, 1984

[54] APPARATUS FOR CONTROLLING AND PROGRAMMING WELDING GUNS

[75] Inventor: Piero Calcagno, Collegno, Italy

[73] Assignee: Comau S.p.A., Grugliasco, Italy

[21] Appl. No.: 345,011

[22] Filed: Feb. 2, 1982

[30] Foreign Application Priority Data

Feb. 18, 1981 [IT] Italy ............................. 67225 A/81

[51] Int. Cl.³ ............................................. B23K 11/24
[52] U.S. Cl. ..................................... 364/477; 219/114; 219/110
[58] Field of Search ............. 364/477, 400, 513; 219/124.1, 121 EL, 121 BD, 121 EU, 121 EY, 121 EW, 110, 114–116

[56] References Cited

U.S. PATENT DOCUMENTS

| | | | |
|---|---|---|---|
| 3,993,889 | 11/1976 | Sciaky | 364/477 |
| 4,063,075 | 12/1977 | Collom | 364/477 X |
| 4,104,724 | 8/1978 | Dix et al. | 364/477 |
| 4,230,929 | 10/1980 | Blair et al. | 219/114 X |
| 4,258,425 | 3/1981 | Ramsey et al. | 364/477 X |
| 4,289,948 | 9/1981 | Jurek et al. | 219/114 X |
| 4,301,351 | 11/1981 | Mathews | 364/477 X |
| 4,317,980 | 3/1982 | Goodrich et al. | 219/108 X |
| 4,417,122 | 11/1983 | Thorne | 219/116 X |

OTHER PUBLICATIONS

Microcomputer Control for Electron Beam Welder, H. Nukumori et al., NEC Research & Development, (Japan), No. 44, Jan. 1977, pp. 1–4.

Primary Examiner—Edward J. Wise
Attorney, Agent, or Firm—Young & Thompson

[57] ABSTRACT

An apparatus for controlling and programming welding guns, constituted by a set of electronic component circuit boards enclosed in a casing provided with a keyboard and a programming and control display unit which are connected electrically together so as to enable various functions to be performed on the static switches of the welding gun to which the apparatus is connected, namely: a first so-called basic function, i.e. without optional circuit boards being inserted, in which the firing angle of the static switches can be varied as a function of the voltage of the welding transformer primary in such a manner as to keep the energy constant, and further functions which can be obtained by using an optional circuit board, including varying the firing angle of the switches as a function of the constancy of the energy dissipated per cycle in the form of heat during welding, with the number of cycles fixed; maintaining the firing angle fixed and varying the number of cycles with automatic stoppage when welding is complete; varying the firing angle to enable the welding current intensity to be kept constant and varying the number of cycles, with automatic stoppage when welding is complete; and varying the firing angle as a function of the constancy of the current delivered per cycle, with the number of cycles fixed.

3 Claims, 16 Drawing Figures

APPARATUS FOR CONTROLLING AND PROGRAMMING WELDING GUNS

DESCRIPTION

This invention relates to an apparatus for controlling and programming welding guns.

SUMMARY OF THE INVENTION

The apparatus for adaptive welding control according to the invention is a programmable device created for all single-phase resistance welding applications using one or two guns controlled by a group of static switches, generally two SCRs.

The main characteristic which distinguishes it is its high level of modularity both in terms of hardware and in terms of software. This characteristic makes it extremely versatile and adaptable to all present and future requirements. In this respect, because of its programmability, the welding characteristics can be completely changed while always using the same device.

In its basic configuration, i.e. without the insertion of optional circuit boards, the proposed apparatus is functionally compatible with the present generation of INDIMO welding controls, with respect to which its performance is superior because of the utilization of the facilities offered by the use of a microcomputer. With this apparatus, the SCR firing angle can be varied as a function of the voltage of the welding transformer primary, so as to keep the energy constant and ensure "plant" reproducibility.

In this respect, if the power voltage (500 V) decreases, the welding control automatically increases the SCR firing angle so as to deliver a greater current, obviously all within certain limits.

In addition to this characteristic, there are many others which make the product technically advanced and of which the description is given hereinafter.

As already stated, the apparatus can be supplied in two versions, namely the first basic version which can be programmed only in one mode and which will be defined hereinafter as "mode 0", and the second version with the ALU circuit board which can be also programmed in modes 1, 2, 3 and 4.

Greater details regarding the various programming modes and the corresponding performance are given hereinafter.

This apparatus can be programmed with 16 different completely independent welding programs which are not dependent on the channel (or gun). Such a high number of programs is offered to the user in order to give maximum versatility in differentiating the welding spots. It is possible for example, when controlling the gun of a welding robot, to differentiate the spots according to the number of metal plates concerned in the welding, the thickness of the plates and the type of plate (treated or untreated), and also according to whether the spots are of primary importance (i.e. must be absolutely soft) or of secondary importance (i.e. a small percentage of not completely correct spots can be accepted).

If a spot is of primary importance, it is convenient to program it in a mode which is different from 0, using narrow welding irregularity intervention thresholds. If a spot is ordinary, it will probably be programmed in mode 0. Innumerable combinations and intermediate positions exist.

It is thus possible to execute a succession of welding spots programmed heterogeneously, using heterogeneous alarm thresholds. A single spot can also differ from another simply by one parameter, which also dictates the need for a large number of welding programs.

It is also apparent that the basic version, although possessing the possiblity of 16 welding programs, is less versatile as it allows operation only in mode 0.

Of the 16 welding programs, the last 4 can be programmed for executing thermal cycles. It is thus possible to execute the welding cycles with a maximum of 6 pulses each of variable form, for operating on special materials which require such treatment.

In this case, each pulse is programmable independently of the others with respect to the following parameters: welding cycles (hot time); interval cycles (cold time); angle (energy dissipated); rising slope ($<$, positive) and falling slope ($>$, negative). With positive slopes equal to $\emptyset$, the first cycle is automatically fired at 87°.

BRIEF DESCRIPTION OF THE FIGURES

These and further characteristics and advantages of the apparatus according to the invention are described hereinafter with reference to the accompanying drawings, in which.

DETAILED DESCRIPTION

The apparatus is in the form of a box 10 composed of a single casing, the front side of which carries the panel 11 (FIG. 2) for the guided conversation with the operator by means of the keyboard and alphanumerical display unit.

Figure 2:
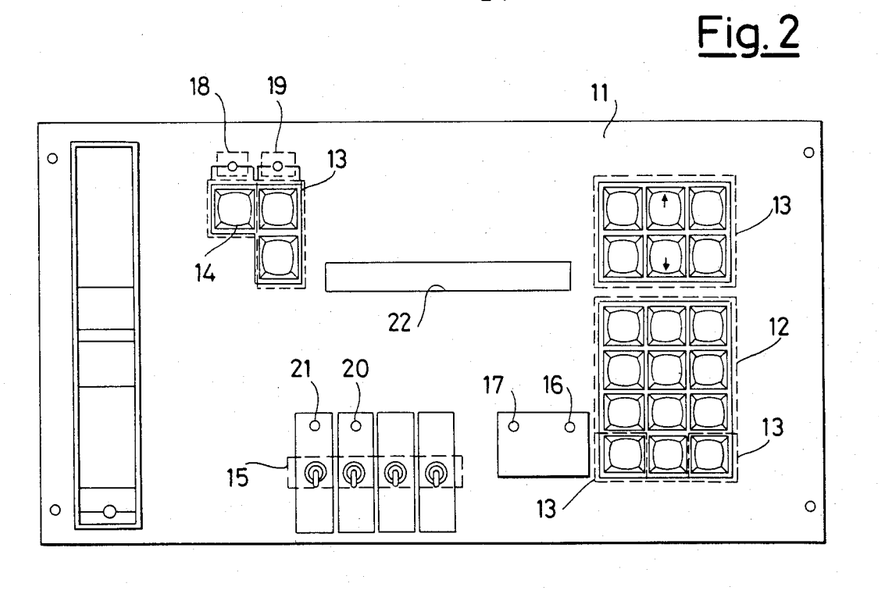
FIG. 2 is a view of its front panel.

The panel of FIG. 2, illustrated by way of example, comprises the following components: a set of numerical keys 12, a set of programming keys 13, an installation key 14, a set of switches 15, an LED 16 for indicating the presence of the interface board in the processor, an LED 17 for indicating the presence of the ALU board, an installation LED 18, a programming or modification LED 19, a welding exclusion LED 20, and an alarm exclusion LED 21. The alphanumerical display 22 can be seen through an aperture in the panel 11. The function of each key of the various LEDs will be apparent hereinafter with reference to the operation of the apparatus.

Figure 1:
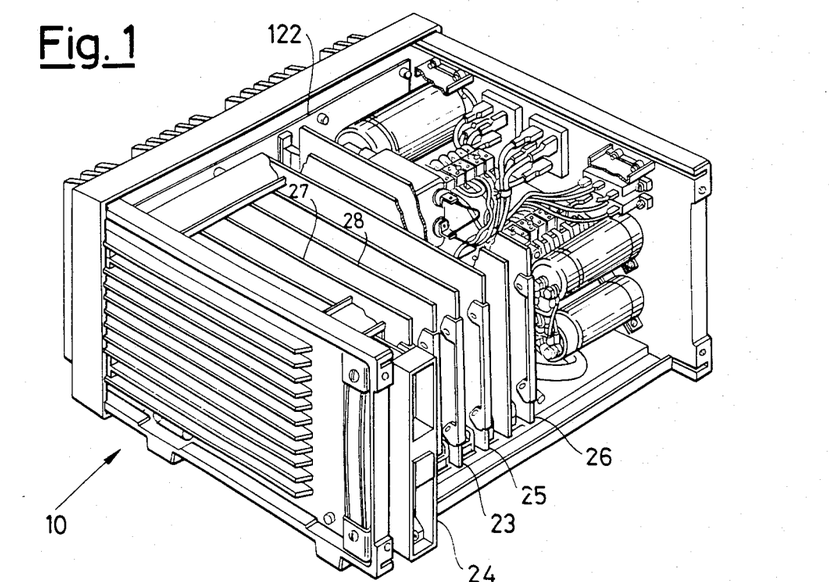
FIG. 1 is a perspective view of the interior of the apparatus.

The main connector for connecting to the welding machine is mounted on the rear side of the box 10. This connector has been chosen on the basis of its robustness, the large number of insertion and withdrawal operations which it can be subjected to (more than 10,000), the high capacity of its contacts (8A), and its insulation voltage (1500 V), and allows a damaged control unit to be rapidly replaced by a spare unit.

The mechanical box casing 10, which acts as the frame for the entire electronic part, is constructed in such a manner as to allow maximum heat dissipation in order to optimize electronic reliability and to ensure intrinsic strength.

The electronic part of the basic configuration functioning in mode 0 consists of six circuit boards, namely a mother board MD 122, into which all the other boards are inserted; a CPU (central processor unit) board 23 on which the microcomputer controlling all the functions is mounted; a PSM (program storage module) board 24 on which the non-volatile working CMOS RAM memory is mounted; an IOM (input/output module) board 25, on which the opto-isolators and circuitry for controlling the inputs and outputs to and from the field are mounted; an MCP (main control panel) board (not shown in FIG. 1) on which the keyboard and the alphanumerical display board are mounted; and an MPS (main power supply) board 26.

Figure 3:
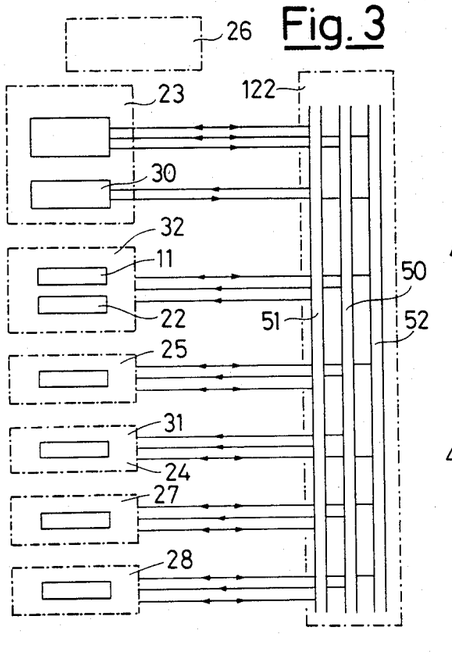
FIG. 3 is the general block diagram of the apparatus.

As already stated, the apparatus also allows optional boards to be inserted for increasing its performance, so making it more intelligent, and allowing an improved reproducibility of the welding as the external parameters vary. In particular, the following can be inserted as shown in FIG. 3: an ALU (arithmetic logic unit) board 27, which allows operation in modes 1, 2, 3 and 4; a CI (computer interface) board 28, which allows serial connection to a remote computer, so making the welding control unit an intelligent unit which is decentralized relative to a main processor center. The interface can also allow connection to a printer for documenting the alarms, the programs executed and the programming in general.

The proposed apparatus has the following special characteristics:
(1) 16 welding programs; (2) facility for executing thermal cycles in 4 programs; (3) compensation of the firing angle as the welding voltage varies; (4) as an alternative to the first welding cycle at 87°, programmed insertion of the rising slope (<); possibility of programming the descending slope (>); (5) intelligent control of the alarms relating to the welding unit with recovery from the abnormal situation (where possible); (6) detection of plant errors; (7) self-diagnosis; (8) memorizing of the alarm, illumination and installation "history" in a non-volatile memory area (black box); (9) 10 opto-isolated inputs (1500 V insulation) at 24 V direct current with a common wire; (10) 10 outputs at voltage-free contacts; (11) guided conversation with the operator by means of a keyboard and alphanumerical display unit; (12) predisposition (connector) for rapid diagnosis; (13) automatic setting on installation; (14) modular hardware-software concept (optional performance obtained by optional insertion of boards); (15) predisposition for rapid replacement without reprogramming (PSM board easily extractable).

The principles of operation of the welding control unit will now be described, the description commencing with reference to a general block diagram of the apparatus illustrated in FIG. 3.

All the functions executed are controlled by the microprocessor on the board CPU 23, which for this purpose utilizes a working memory of 256 bytes, a CMOS RAM program memory 31 having a capacity of 1K or 2K according to whether the scheduled operation is normal (mode 0) or multi-mode (mode 0, 1, 2, 3, 4), and the system control software memorized on the EPROM 30.

The microcomputer, consisting essentially of a microprocessor, receives at its input the following signals: data originating from the keyboard 11 during the program writing stage; data originating from the memory RAM 31 during the program execution stage; signals of external origin by way of the input/output IOM board 25; special signals indicating the state of operation of the control unit; plus the necessary supply voltages.

In its turn, the microcomputer feeds the control signals for operating the functions performed by the other boards.

The signals for the interactive conversation between the operator and the apparatus are exchanged between the front MCP board 32 and the CPU board 23. In particular, the data set by the operator reaches the CPU 23 from the keyboard panel 11 and the relative coder, and the CPU 23 feeds the signals corresponding to the various messages to the alphanumerical display unit 22.

The compiled programs are memorized in the RAM memory 31 on the PSM memory board 24, and are then recalled by the CPU 23 during execution. This data, suitably processed, is fed to the input/output IOM board 25 for subsequent feeding to the field. Likewise, the signals of external origin indicating the state of operation of the welding machine reach the CPU by way of the same board for suitable processing.

The optional boards ALU 27 and the processor interface CI 28, if inserted, exchange their signals with the input/output IOM board 25.

Finally, all the boards are connected together by the mother board MB 122 on which there is also the connector for connecting to the field.

A description will now be given of each board and its function with reference to the drawings illustrating each block diagram thereof.

Figure 4:
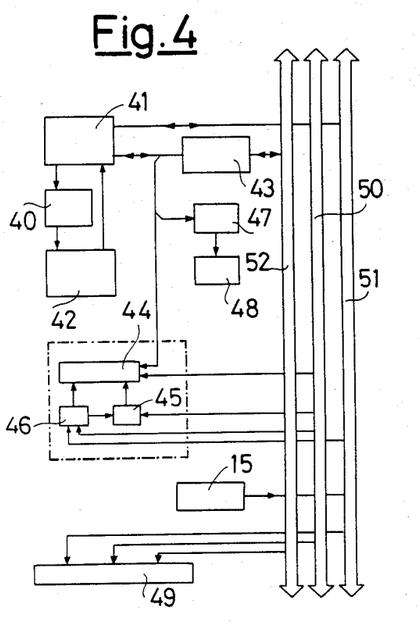
FIGS. 4–12 are block diagrams of electronic components of the apparatus.

The front MCP board 32 has the block diagram of FIG. 4. The keyboard on the front board is organized in the form of a matrix consisting of 4 rows and 8 columns. The row-by-row scanning of each matrix is controlled by the decoder 40, which at its input receives the row selection signals from the keyboard and display control 41. As soon as it is verified that a key has been pressed, 42, in one of the rows, a word of 8 bits corresponding to the said key is fed to the control section 41.

In its turn, the control section 41 receives commands from the CPU 23, and feeds the switching request signal to the CPU.

On receiving the control selection signal or reading signal, the bus receiver-transmitting 43 is activated so that it feeds the data from the keyboard 42 to the CPU across the connector pins on the mother board MB 22.

However, if only the writing signal is present, the data from the CPU across the pins is fed for its display to the display board 44 by way of the receiver-transmitter 43.

The cyclic selection of 4 chips of the display board 44 is done by a multiplexer decoder 45 which at its input receives the addresses from the address bus 50.

The PROM 46 activates the mutliplexer 45 and the writing of the display board 44.

On the front board of FIG. 4 there is present an integrated circuit 47 with 8 flip-flops of type D for illuminating the LEDs 48 present on the front panel 11.

The integrated circuit 47 receives the data word at its input, and its contents are updated each time a specific writing command for that register is emitted.

The four switches 15 on the front panel 11 feed data relating to their state by way of the pins.

Finally, it should be noted that all signals originating from the CPU or fed to it are also present at a special connector 49 mounted on the front board.

This connector, connected either to a specific apparatus (simulator) or simply to a logic analyzer, is used for the diagnostic operations which allow any fault to be identified.

Figure 5:
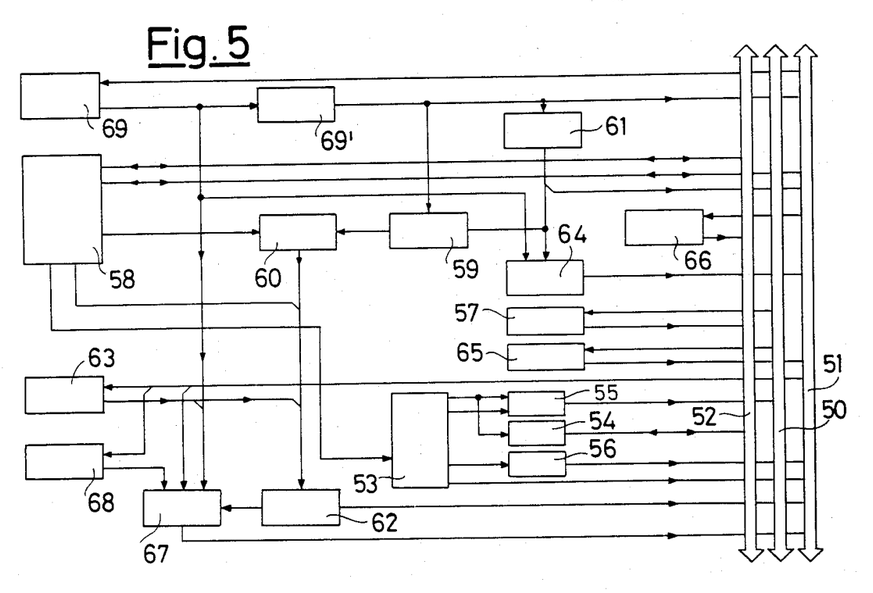

The CPU board 23 is shown in FIG. 5.

This board represents the heart of the entire apparatus, and is formed by a microprocessor 53 together with the control circuits for the data bus 52, the address bus 50 and the command bus 51, constituted by a data buffer 54, address buffer 55 and command buffer 56 respectively.

The software used by the CPU board is memorized on EPROM memories 57 for a total of 10K bytes.

These memories are addressed with bits from A∅ to A11, and their outputs are connected to the data bus 52.

The CPU uses the 256 bytes of the integrated circuit 58 as its working memory.

A counter 59 and a comparator 60 for determining the firing zone are connected to this integrated circuit.

As the mains frequency passes through zero, the counter 59 is zeroed and then begins to count with the clock generated by the time base generator 61.

When the counter contents equal the data from the integrated circuit 58 corresponding to the firing angle set by the operator, the comparator 60 feeds a firing zone recognition bit to the microprocessor 53.

Simultaneously, a gate of the integrated circuit 58 feeds a bit representing the firing activation signal to the circuit which controls the pulse transformer 62 of the external firing unit.

If in addition to the firing zone recognition signal and firing activation signal, the signal indicating the presence of voltage at the SCRs of the detector circuit 63 is high, the pulse transformer 62 mounted externally for firing the SCRs becomes operated.

The signal of the time base generator 61, which is fed to a hardware control section 64, is generated together with other signals, by the programmed time base.

This circuit is formed from two cascade-connected counters, of which the clock signal is that fed by the integrated circuit 58.

The counter outputs represent the address inputs of a PROM 65 programmed so as to feed to flip-flops signals corresponding to those of the time base.

The voltage of the welding transformer primary, which is reduced to low voltage by a sensor mounted on the machine, is fed to a circuit 66 which transforms i. .o a digital value and preserves its value in a register 67.

The output of this register at the data bus is used by the CPU for any variation in the firing angle in mode 0.

The cos ∅ signals arrive automatically from the external firing unit for identifying the presence of voltage at the SCRs and the presence of power voltage at the welding plant respectively, by way of suitable circuits 63 and 68.

An alternating voltage of 20 V is fed from the power supply unit 69 for generating a square wave form of 50 Hz at 69′.

The wave form is fed both to the outside for controlling the software, and to the inside of the board itself to a circuit which generates a pulse for each transit through zero.

Figures 6, 8, 9:
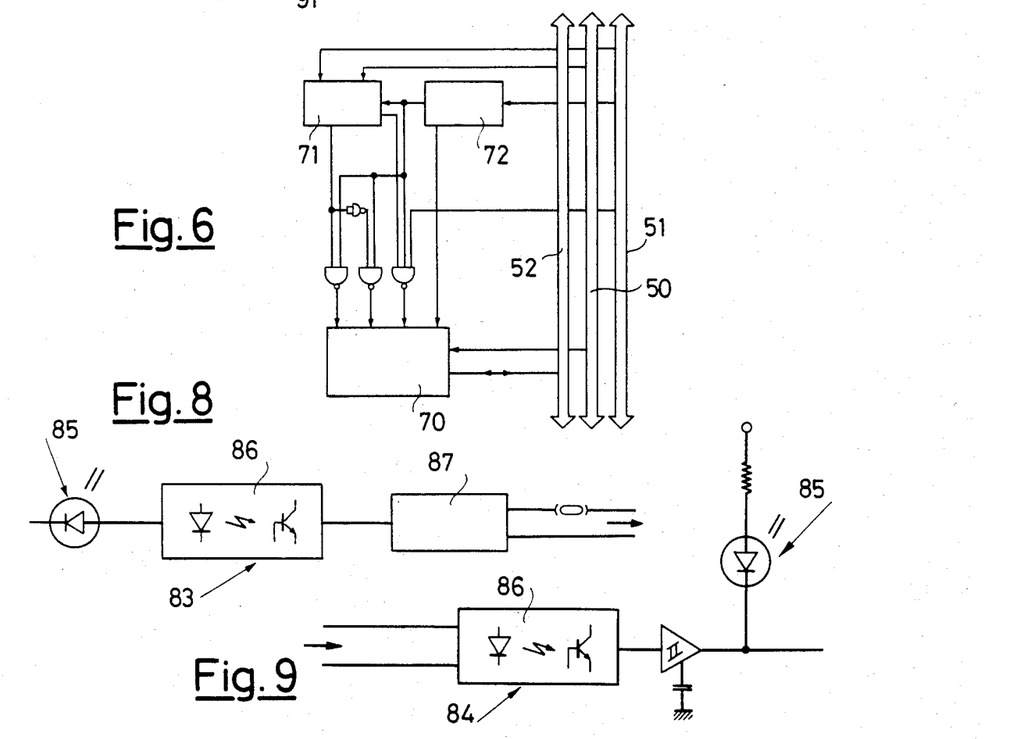

The PSM program memory board 24 is illustrated in FIG. 6. The RAM memory 70 used for memorizing the programs set by the operator, and as a "black box" for memorizing the alarms, consists of two chips of 1K words of 4 bits, thus obtaining 1K words of 8 bits. When expanding to the modes 1, 2, 3, 4 by means of the ALU board, it is necessary to mount a further 1K×8 bits.

For the electrical supply and control of the operation of the memory, the board receives signals which, when suitably correlated as indicated in summary form in FIG. 6, are used to provide the activation signals at 71, the reading or writing command, and the supply to the memory chips.

On the memory board 70 there are also three rechargeable batteries having a capacity of about 150 mA/h, to act as buffer batteries. They are automatically recharged during operation, and when fully charged have a life of about 2 months. Their purpose is to keep the memories supplied during the period in which the apparatus is switched off, so that the memorized data is not lost. It should be noted that if the PSM board is to be kept at rest for a long period, it is necessary to disconnect the batteries, by operating the appropriate microswitch.

Figure 7:
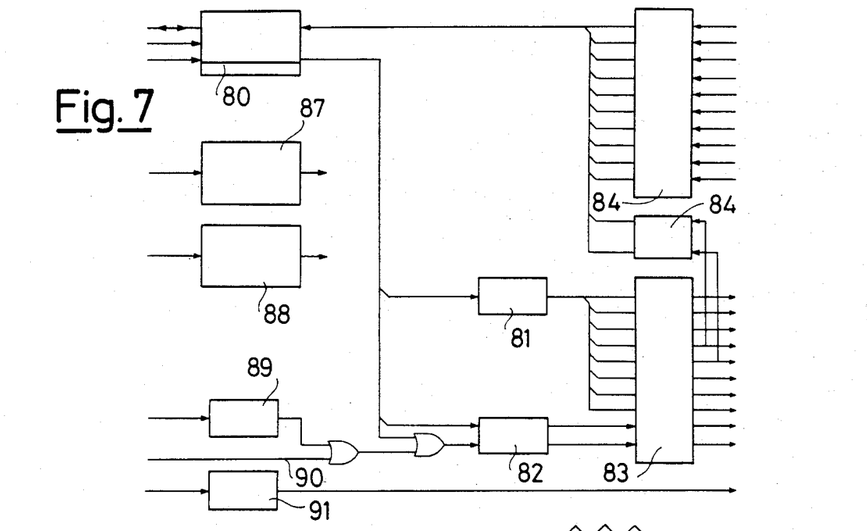

The IOM board 25 (input/output module) is shown in FIG. 7.

The basic element of the IOM board is the programmable interface 80 which controls all the functions performed by the board. At its input, this integrated circuit receives command signals from the CPU, and the signals at the output from its gates are fed to the two pilot stages 81 and 82 which feed them in their turn to the output circuits 83.

The input signals from the field reach the input circuits 84, and pass from these to the interface 80.

Each output circuit (FIG. 8) is constituted by an LED 85 at digital electronic level (+5 V), which is illuminated if the relative signal is present, an optical isolator 86, and a relay 87.

A 3 A fuse is also formed at each output by means of a constriction in the printed circuit track (localized rupture).

If a deformity occurs, this signifies that the relay is not functioning correctly, and consequently the circuit breaker cutout signal is emitted. All this is necessary to prevent any accidents due to undesirable closure of the welding solenoid valves. In this respect, if the signal at the welding solenoid valves is not the correct one, the welding operation is immediately interrupted.

Each input circuit (FIG. 9) is constituted basically, in a similar manner to the output circuits, by an optical isolator 86 and by the LED 85 indicating the input presence of the relative signal at digital electronic level (+5 V).

Besides the input and output circuits and their control stages, the board also comprises the circuit which checks any malfunctioning of the software 89 or hardware 90.

Finally, three further circuits are present on the board for the following checks and controls:

checking whether the mains voltage is outside tolerance, 87;

checking whether the control or power supply unit is at excessive temperature, 88;

controlling the pulse transformer, 91.

Figure 11:
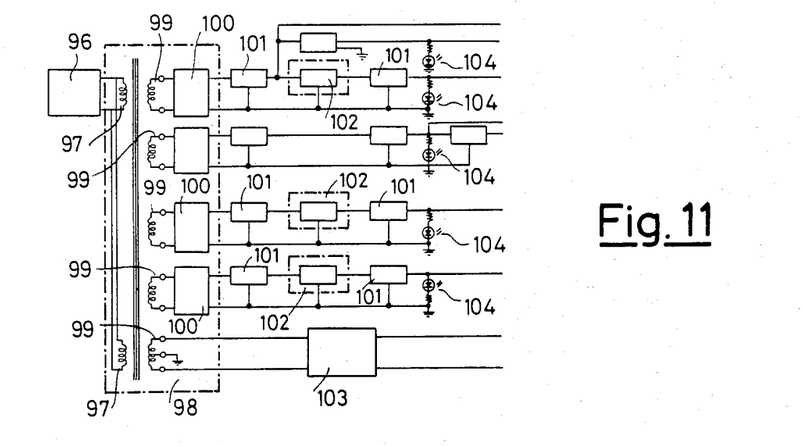

The MPS board 26 (main power supply) is shown in FIG. 11.

The mains voltage passes through the mains filter 96 to the two primaries 97 of the supply transformer 98. The following voltages are available at its five secondaries: (1() 9 V-10 A; (2) 20 V-4 A; (3) 17 V-1 A; (4) 17 V-1 A; (5) 20 V-0.5 A.

The first four voltages are treated in a similar manner so as to obtain the required values as output. More specifically, each voltage is rectified by a diode bridge 100, filtered by a group of capacitors 101, regulated by a voltage stabilizer circuit 102 except for the 20 V voltage, further filtered by a capacitive output filter, and finally fed to the board connector. An LED diode 104 is also present at each output to indicate the presence or absence of the corresponding voltage.

In contrast, the 20 V voltage is fed from the fifth secondary to a squaring circuit 103 and then to the connector for suitable use by the CPU.

It should be noted that the parts enclosed by the dashed and dotted lines in FIG. 11 are not mounted directly on the power supply board. More specifically, the stabilizer circuits are mounted on the heat sink, on which the thermistor is present for recognizing excessive temperature.

The mother board MB 122 forms the core of the apparatus. It is disposed on the base of the apparatus, and on it there are mounted the connectors into which the other boards are inserted, plus the connector for connection to the field. The tracks of its printed circuit form the signal interconnections between the various boards.

The apparatus is arranged to accept both hardware and software on optional boards which widen its performance. These boards are two in number, namely:
the adaptive ALU board 27 for operation in modes 1, 2, 3 and 4;
the computer interface CI board 28 for connection to a remote computer or printer.

Figure 12:
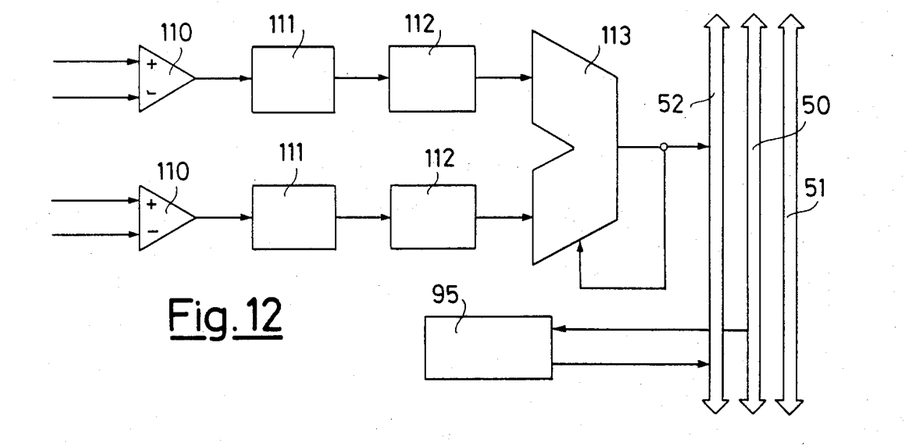

The ALU (arithmetic logic unit) board is shown in FIG. 12.

The ALU board is composed essentially of two analog channels 110 over which signals are fed proportional to the welding voltage and current. The signals, from which any disturbances which may be present are removed, are fed to the automatic self-setting circuit, and converted by suitable circuitry 112 into numerical data which can be processed by the integrated circuit 113 which operates as a multiplier/accumulator. The three output registers can be read by the main microcomputer which controls the apparatus.

Figure 10:
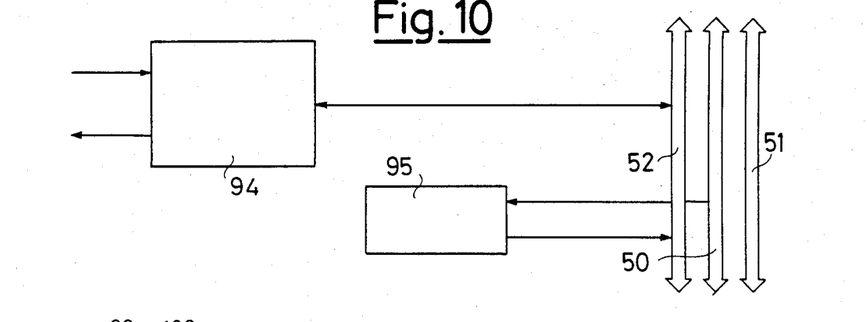

The CI (computer interface) board 28 is shown in FIG. 10.

The CI board is constituted essentially by a programmable communication interface 94 which converses with the field by means of current loop serial line control devices.

A programmable particle generator determines the line reception-transmission speed.

The program relative to outside communication is located in the EPROM 95.

A further characteristic which distinguishes the apparatus according to the invention is the facility for compensating the firing angle as the welding voltage varies (mode 0).

Figure 13:
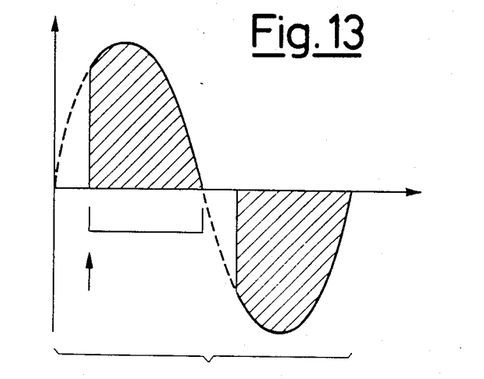
FIG. 13 is a diagram of a welding cycle.

The control unit controls the power SCRs at the welding transformer, by firing them at a predetermined angle during the cycle (FIG. 13).

Figure 14:
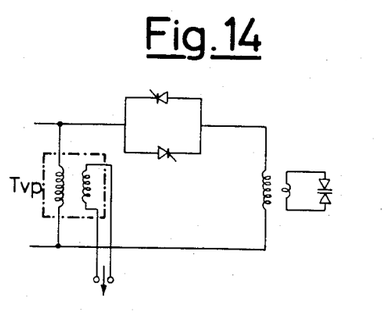
FIG. 14 is the electrical circuit diagram of a welding transformer.
Figure 15:
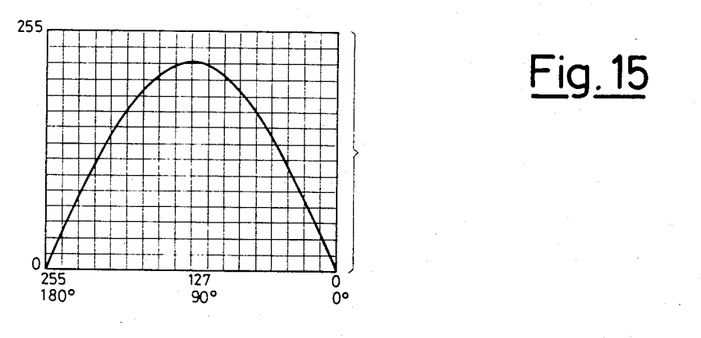
FIG. 15 is a quantifying diagram of a half wave.

The transformer $T_{VP}$ across the primary of the welding transformer (FIG. 14) takes the voltage present and reduces it to safety levels of about 5 V, to then feed it to an analog/digital converter which converts it into a number of 8 bits. The half wave is thus divided into 256 voltage levels. Likewise, the 180° angle of the half wave is divided into 256 parts, each equivalent to about 0.703° (FIG. 15).

Figure 16:
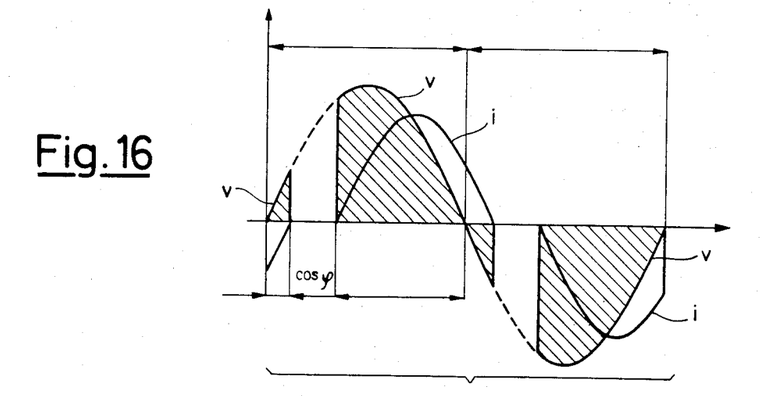
FIG. 16 is a diagram showing the firing angle and the relationship between the current and voltage.

The control unit recognizes a minimum voltage change of 1/255, and consequently varies the firing angle by a quantity suitably calculated so as to maintain the power fed to the welding gun constant. FIG. 16 shows the relationship between the welding voltage and current.

Tables can thus be drawn up showing the relationship between the angle in electrical degress and the angle set during programming, and also between the measured cos ∅ of the phase displacement between i and v, the effective cos ∅, the electrical degrees and the angles to which certain welding power percentages correspond. It should be noted that set angles greater than those corresponding to 100% of the welding power do not contribute anything further beyond the maximum.

Alternatively, on commencing welding with a firing angle of 87°, it is possible to insert a certain number of rising slope cycles. Likewise, the falling slopes are programmable, i.e. the control unit initially fires the SCRs at a small angle, to then rise to the angle programmed in the set number of cycles. If for example the programmed angle is 200 with two cycles of rising slope, the connected microcomputer calculates the welding power corresponding to the set full working angle (200)', divides the calculated value into three parts, and seeks the angle corresponding to this power, with which it fires the SCRs in the first slope cycle. For the second cycle it seeks the angle corresponding to $\frac{2}{3}$ of the total power, to finally reach the third cycle, i.e. the full working cycle, at the angle corresponding to the total power.

In this manner, by using the microcomputer the apparatus operates linearly on the welding power.

During welding, a situation in which one SCR does not fire during a half wave whereas the second SCR fires normally during the opposite half wave must be prevented. If this happens, the transformer becomes saturated with the possibility of seriously damaging the static switches. It is therefore necessary for the two firing angles in the positive and negative half waves to be absolutely identical. If this is not the case, the apparatus seeks to make-up the firing operation which did not take place. If for example during the first welding cycle there is no firing during one of the two half waves, the control unit allows the next half wave to pass and then again attempts firing during the half wave corresponding to that in which the firing previously failed.

This entire procedure is repeated for a maximum of five times, after which an error warning is given. If the firing fails during the cycle following the first, the described procedure is repeated only for a maximum of two times, so as not to alter the thermal characteristics of the welding spot. The sensors mounted on the welding transformer, namely one in mode 0 and 3 in modes 1, 2, 3 and 4, make it possible to indicate operational irregularities in the system. In the case of three sensors, the diagnosis is more accurate.

The apparatus is able to carry out automatic fault diagnosis, giving a relative alarm in the case of malfunction. The more significant checks are as follows:
(1) Hardware blocked: this alarm acts directly on the outside with a 010 output, to cause cut-out of the circuit breaker which, if connected externally, switches off the apparatus;

(2) Software blocked: if at every 40–50 msec the software does not give an indication of correct operation, the effect is similar to that in the case of hardware blocked;

(3) Electrical supply incorrect: this checks whether the apparatus supply voltage varies beyond a range of ±15% of the rated value. If this happens, it continues to execute the set programme but indicates malfunction of the system;

(4) CMOS RAM programme memory soiled or faulty;

(5) Excessive temperature: the apparatus checks that the temperature does not exceed +100° C. in the heat sink on which the stabilized supply units are mounted, and +70° C. inside the device.

A certain number of cells of the non-volatile RAM memory is reserved for memorizing the alarms, illuminations and installations which have taken place during operation. These operate as a "black box" to give easier indentification of the recent control history.

The apparatus possesses 10 opto-isolated inputs and 10 outputs at voltage-free contacts, so enabling loads to be controlled both at +24 V.d.c. and at 110 V.a.c.

The alphanumerical display unit of 16 characters and the keyboard on the front panel allow conversation between the operator and the apparatus.

In addition to operating mode 0, the control unit can also operate in modes 1, 2, 3 and 4, as stated.

When fitted with the ALU board, the apparatus provides further performance beyond the basic configuration, and is able to read the instantaneous welding current, voltage and power, and to control a very large number of welding parameters.

The following further performance is possible: Welding in mode 0 with monitoring of the cos $\emptyset$ and welding current bands during the pulse full working cycles if the programmed pulse is single, or of the last one if it is multiple.

This is used for recognizing welding errors, such as the type of short-circuit welding (absence of plates), secondary circuit damaged or interrupted (braiding to be inspected and replaced if necessary etc.), ferromagnetic masses close to the welding machine which considerably vary the operating conditions, so influencing welding.

Welding in mode 1 with the firing angle variable as a function of the constancy per cycle of the energy dissipated in heat during welding, and number of cycles fixed.

This is used for very accurate welding with high reproducibility for equal surrounding conditions, i.e. plates, electrodes etc. In general, the welding is 10–20% longer in terms of numbers of cycles than the corresponding welding in mode 0 (in order to obtain the same effect).

Welding in mode 2 with fixed firing angle and variable number of cycles, with automatic stoppage when welding is complete.

In contrast to the welding control units presently available commercially, which make a reading on a single spot for each welding cycle (normally they read the voltage and current where di/dt=0), the apparatus uses the integral both of the current and of the voltage, so minimizing any errors due to false readings in positions coinciding with disturbances.

This welding mode is used where the surrounding conditions (number of plates, plate thickness, electrode deterioration, power voltage variations etc.) vary. Typically, it is possible by using this welding mode to compensate for a variation in the surrounding conditions which are in the ratio of 1:2 (±50%).

As an example, if the correct parameters are set for welding two plates having a thickness of 1.6 mm, the automatic control system will operate correctly to enable three (1+2) plates of 1.6 mm, or two plates of which one is 1.6 mm thick and the other is between 0.8 mm and 2.4 mm thick to be welded. This ratio is not the maximum value, but only a typical value, but by further varying the ratio the welding becomes carried out less correctly in that it would be necessary to change both the size of the welding tip and the pressure with which the electrodes act. These parameters cannot be controlled by the apparatus.

Welding in mode 3 with the firing angle variable so as to keep the welding current intensity constant (by setting the CURRENT), and with the number of cycles variable, with automatic stoppage when welding is complete.

This is used for welding where maximum adaptability is required. The typical adaptability ratio is 1:1.5 (±66%). It operates effectively on dirty and/or processed (zincrometal etc.) plates.

For example, if the parameters are set for correctly welding two plates each 1.6 mm thick, mode 3 easily allows welding of two plates both 0.8 mm thick, or three plates all 1.5 mm thick, or four plates of 1.5+0.8+0.8+0.8 mm thickness. It is less effective than mode 2 in terms of compensating for electrode wear.

Welding in mode 4 with the firing angle variable as a function of the constancy of the current delivered per cycle, and with the number of cycles fixed. This is used for welding in which the surrounding conditions vary to only a limited extent, such as an adaptability ratio of 1:2.5 (±40%), in which high reproducibility is required with only slight electrode deterioration (electrode wear is not compensated in this mode). This is effective in the case of processed plates (zincrometal etc.).

It is always possible to introduce control of the current band and cos $\emptyset$ independently of the mode used. In this respect, if an adaptive mode on the current constancy is used (3 or 4), any current abnormality, for example short-circuit welding, is difficult to detect as it automatically seeks to return it to its normal value.

When usuing the ALU board, the apparatus allows type 1 rapid squeezing, with automatic recognition of when the plates are squeezed, so shortening squeezing and pressure times for all welding modes.

The proposed adaptive welding control device is a device supplied at 110 V/50 Hz, but also with a version for 115 V/60 Hz.

Inside the apparatus, the only voltage which can be dangerous for the operator, should he come into contact with it, is the supply voltage, which follows a path through the mother board, the power supply board and the supply transformer.

The user can also extend the distribution of the 110 V voltage by directly using the output contacts of the input/output board for controlling other apparatus operating at this voltage. A check should be made that the apparatus is not connected to the supply mains before beginning any maintenance work, and especially before extracting or inserting a board. If this is not done, then damage to the electronic parts can result.

It should be noted that the power voltage of the welding transformer primary in no case enters inside the welding control unit.

From the software aspect, each program executed can be divided into two parts, namely the main part and the dialogue part.

Such a division is logical. This is because when one part is operating, the other cannot operate and vice versa. Each of these two parts comprises modules with interrupts and restarts, i.e. non-synchronous events which can interrupt the progress of that part being executed, in order to execute a certain function, and then restart the interrupted program without varying the conditions existing at the moment of the interruption.

The main part is that which is connected both to the dialogue part and to the actual subroutines of the system. It is composed of: (1) the main welding program; (2) the installation module; (3) a collection of all the subroutines which can be recalled by all the modules with the exception of the dialogue part; and (4) the module which describes the mode of operation.

The dialogue part comprises:
(1) the module which contains and describes all the fields of the 16 programs which can or cannot be set, and
(2) the module which contains the messages to be displayed in ASCII code.

It should be noted that the basic version comprises the software couplings for inserting the software module containing the adaptive programs relative to modes 1, 2, 3, 4, memorized in the ALU board, and for inserting the software module relative to the conversation with the computer processor or printer, as contained in the CI board.

The 16 available programs can be divided into two groups in relation to the type of welding which has to be carried out.
(a) The first group is constituted by the first 12 programs, used for welding operations on standard material, however all 16 programs can if necessary be used in standard mode.
(b) The second group is constituted by programs 13 to 16, which are used for welding operations on special materials. They give the possibility of executing thermal cycles with a maximum of six special pulses, each of variable form.

The messages which appear on the display unit can be divided into two categories:
messages which appear during the writing of the program and during its reading, and can be set by the operator;
messages which appear only during the reading of the program, and indicate values measured during the program execution.

What we claim is:

1. Apparatus for controlling and programming the energization of the guns of a welding device, comprising
   (a) main control means (32), including
      (1) keyboard means (11) for programming the successive steps of a welding sequence; and
      (2) an alphanumerical display unit (22) for displaying communication messages between said control means and the operator thereof;
   (b) programming means for delivering control signals to said main control means, said control signals corresponding to the welding program sequence provided by the operator via said keyboard means, said programming means including
      (1) program memory means (30) for storing a welding sequence program; and
      (2) microprocessor means (23) for processing signals for execution of the welding program;
   (c) input/output means (25) connected with said microprocessor means;
   (d) electrical supply means (26) providing power to said microprocessor means;
   (e) program storage means (24) connected with said microprocessor means for providing signals indicating the operational state of said control means;
   (f) second memory means (31) for storing the welding programs formulated between said main control means and said programming means, said microprocessor means processing signals from said program memory means, said input/output means, and said program storage means to control the firing angle of the static switches of the guns of the welding device as a function of the voltage across the primary of the welding transformer, thereby to maintain the energy constant.

2. Apparatus as defined in claim 1, and further comprising an arithmetic logic unit (27) connected with said microprocessor means and with said input/output means, said arithmetic logic unit sensing the instantaneous welding current, voltage, and power of the welding device for varying the firing angle of the static switches of the welding guns, for varying the number of welding cycles, for monitoring the operation of the welding guns, and for controlling the duration of the welding cycles.

3. Apparatus as defined in claim 1, and further comprising interface means (28) connected with said microprocessor means and said input/output means for exchanging signals therebetween, said interface means affording serial connection to a computer and printing device.

* * * * *